(12) United States Patent
Ewer

(10) Patent No.: US 6,262,365 B1
(45) Date of Patent: Jul. 17, 2001

(54) CEILING FEED ASSEMBLY ADAPTABLE TO FIT RACEWAYS HAVING DIFFERENT CROSS-SECTIONAL CONFIGURATIONS

(75) Inventor: Stephen R. Ewer, Milford, CT (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 09/274,734

(22) Filed: Mar. 23, 1999

(51) Int. Cl.$^7$ ....................................... H02G 3/04
(52) U.S. Cl. .................... 174/48; 174/50.54; 174/68.3; 174/71 R; 220/3.92; 52/220.5
(58) Field of Search ................ 174/48, 50, 50.54, 174/50.57, 50.59, 68.3, 95, 100, 49, 65 R, 71 R, 72 R, 72 C, 88 R, 72 A; 220/3.92, 3.94; 285/154.1, 907

(56) References Cited

U.S. PATENT DOCUMENTS

| | | | |
|---|---|---|---|
| 1,254,528 | * | 1/1918 | Paiste ........................ 174/48 |
| 3,728,470 | * | 4/1973 | Maier ........................ 174/58 |
| 4,988,831 | * | 1/1991 | Wilson et al. ............... 174/65 R |
| 5,300,731 | * | 4/1994 | DeBaratolo et al. .......... 174/48 |
| 5,629,496 | * | 5/1997 | Navazo ...................... 174/48 |
| 5,756,933 | * | 5/1998 | Pitchford et al. ............ 174/48 |
| 5,929,380 | * | 7/1999 | Carlson et al. .............. 174/68.3 |
| 6,107,567 | * | 8/2000 | Blalock ..................... 174/58 |

* cited by examiner

Primary Examiner—Anthony Dinkins
Assistant Examiner—Adolfo Nino
(74) Attorney, Agent, or Firm—Michael R. Swartz

(57) ABSTRACT

A ceiling feed assembly is adaptable to fit with any one of three prior art raceways having different cross-sectional configurations. The ceiling feed assembly includes a ceiling fitting having a base and a cover on the base. The base is mountable to a wall and the cover is removably interfittable with the base. The cover has a front panel including a first opening and first and second removable portions. The first portion is removable from the front panel for defining a second opening in the front panel of a different configuration from and overlapping a portion of the first opening. The second portion is removable from the front panel for defining a third opening in the front panel of a different configuration from the second opening and of a different configuration from and overlapping at least a portion of the first opening. The first, second and third openings are for respectively receiving first, second and third raceways having different first, second and third cross-sectional configurations. The assembly also includes a raceway adapter disposable adjacent to and aligned with the front panel of the cover about the third opening in the front panel of the cover. The adapter is configured to receive and at least partially fit around the third raceway and also interfits with a portion of the front panel of the cover such that the adapter blocks a portion of the first opening of the front panel above the third opening thereof.

24 Claims, 4 Drawing Sheets

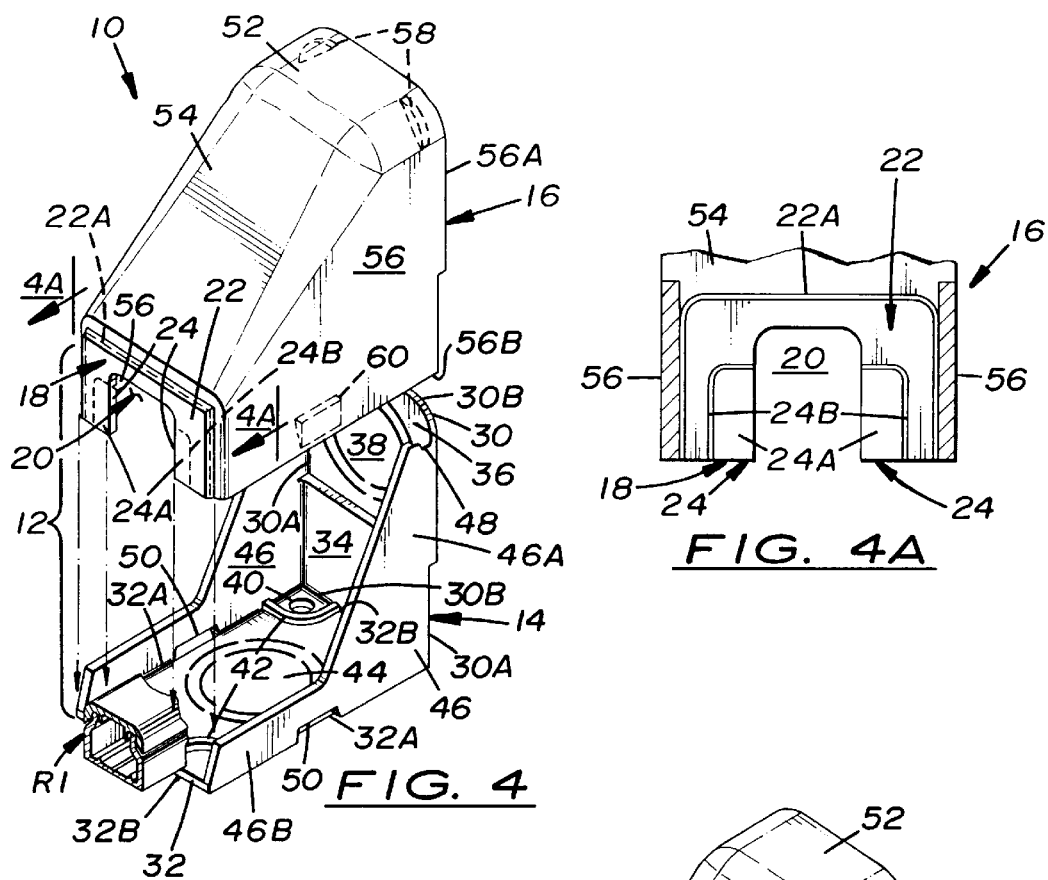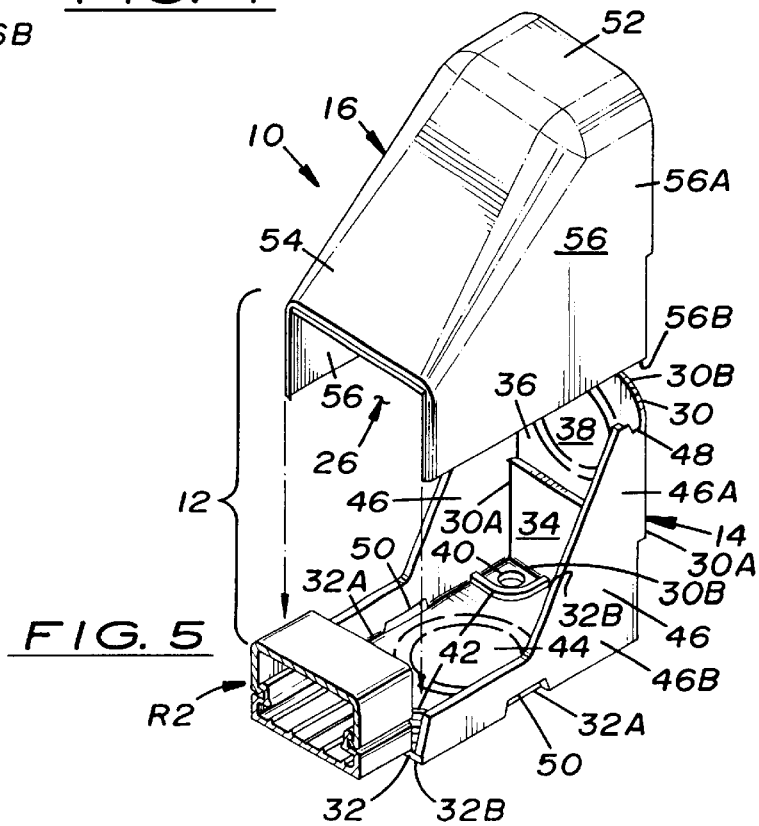

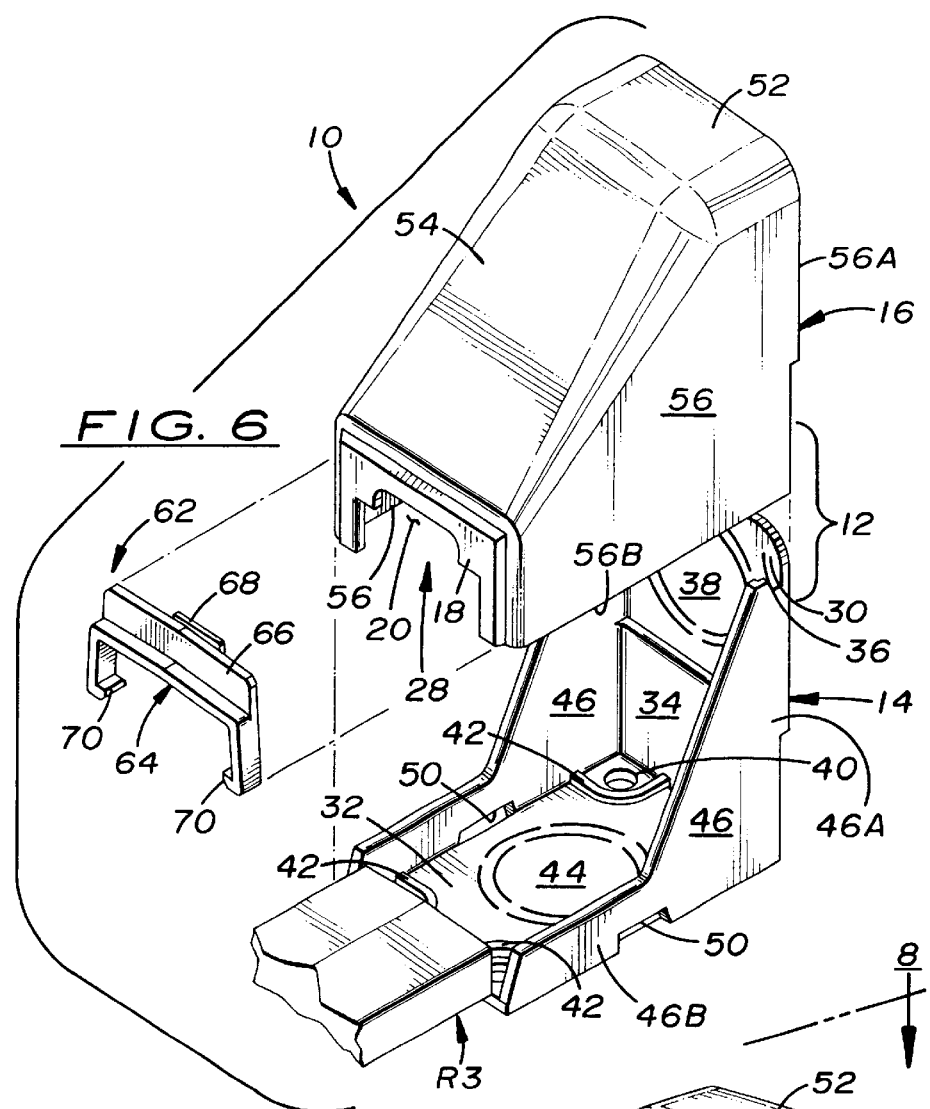
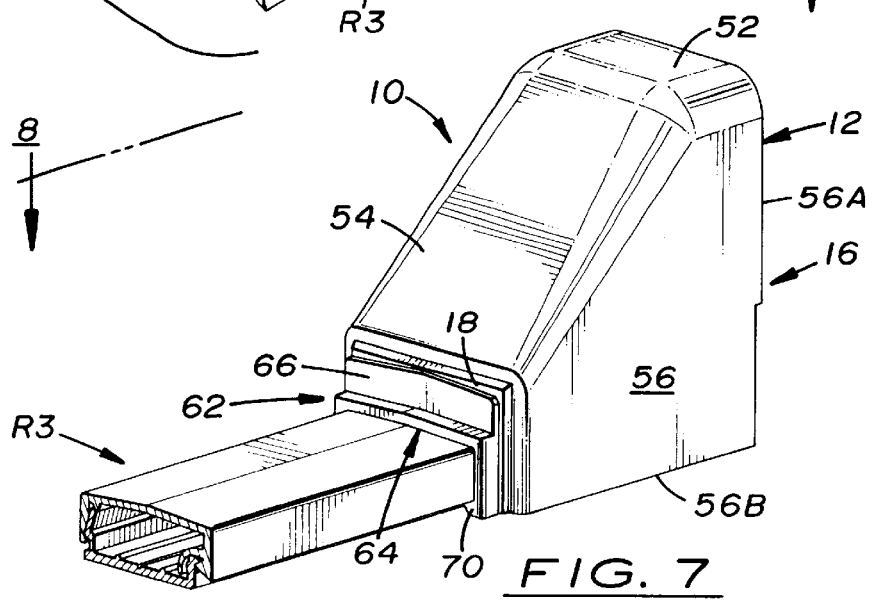

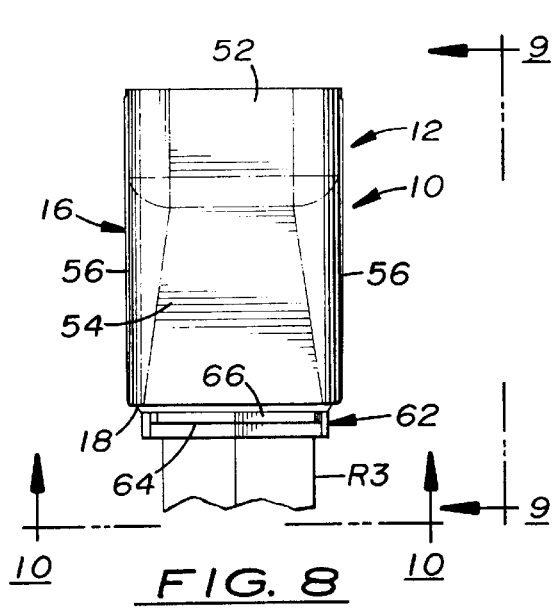
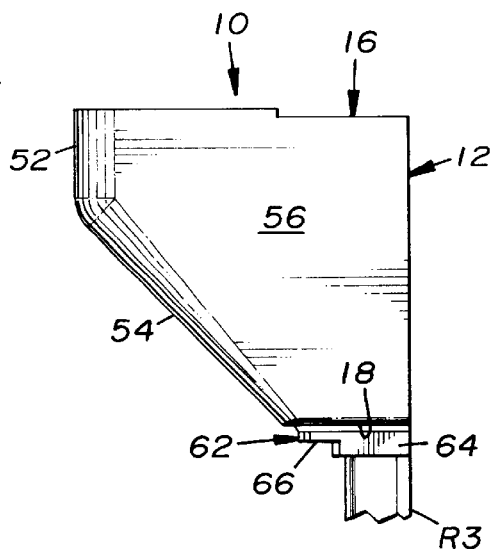
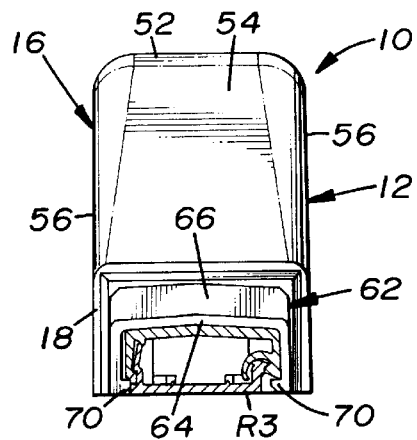
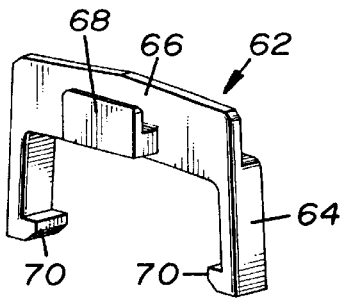
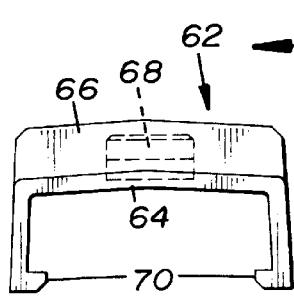
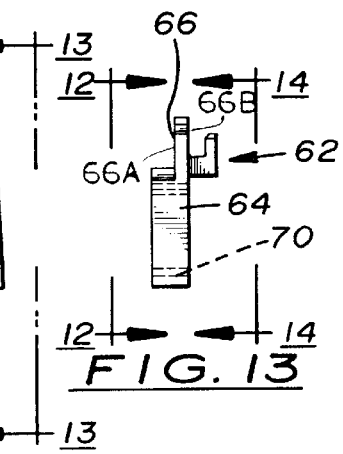
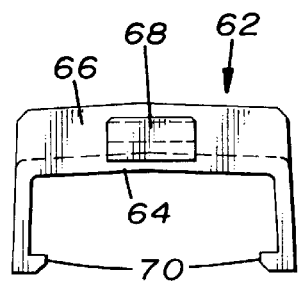

CEILING FEED ASSEMBLY ADAPTABLE TO FIT RACEWAYS HAVING DIFFERENT CROSS-SECTIONAL CONFIGURATIONS

BACKGROUND OF THE INVENTION

1. Field of the Invention

The present invention generally relates to cabling delivery and management systems in office environments for feeding premise cabling from above ceilings downward to work stations and, more particularly, is concerned with a ceiling feed assembly adaptable to fit raceways having different cross-sectional configurations.

2. Description of the Prior Art

Typically in commercial environments, premise cabling systems for transmission of voice, data, video and power are distributed throughout the buildings hidden from view above suspended ceilings. Branches or short lengths of such cabling are then routed from above the ceiling downward to individual work stations through elongated ducts called raceways which are provided to enclose the cabling and to maintain the aesthetics of the commercial environment. The raceways are installed to run from ceiling fittings mounted below the ceiling, downward along walls or vertical columns, to the work stations.

Hubbell Premise Wiring, a division of Hubbell Incorporated of Orange, Conn., manufactures and sells components for constructing premise cabling systems for commercial environments. Among these components are three raceways, designated as R1, R2, R3 in FIGS. 1 to 3, having different cross-sectional configurations, namely, different shapes and/or sizes. The raceway R2 has a width W2 substantially greater than the width W1 of the raceway R1 but only slightly greater than the width W3 of the raceway R3. The raceway R2 has a height H2 substantially greater than the height H3 of the raceway R3 but only slightly greater than the height H1 of the raceway R1. The height H1 of the raceway R1 is substantially greater than the height H3 of the raceway R3, while the width W3 of the raceway R3 is substantially greater than the width W1 of the raceway R1. Each of the raceways R1, R2, R3 has a two-piece construction which includes an elongated bottom channel B and an elongated top cover T overlying and removably fitted onto the elongated bottom channel B. The bottom channel B has an U-shaped cross-sectional configuration and the top cover T has an inverted U-shaped cross-sectional configuration. The cross-sectional shapes of the raceways R1, R2, R3 differ slightly from one another due primarily to the differing shapes of the complementary interfitting detent elements D1, D2, D3 defined on the opposite longitudinal edge portions of the bottom channel B and top cover T of the raceways R1, R2, R3. These interfitting detent elements D1, D2, D3 provide for removably snap fitting the top cover T onto the bottom channel B of the raceways R1, R2, R3.

Raceways of the different cross-sectional configurations are typically installed to handle different capacity requirements of the premise cabling routed to different work stations. As a result, the ceiling fittings used with the raceways also are provided in different sizes and shapes to accommodate the different raceways. The problem with this accepted practice is that it is costly to manufacture and maintain in inventory the different ceiling fittings to match the different raceways in order to fulfill the different commercial requirements as they arise.

Consequently, a need exists for innovations in the design of ceiling fittings which will overcome the above-described problem without introducing any new problems in place thereof.

SUMMARY OF THE INVENTION

The present invention provides a ceiling feed assembly designed to satisfy the aforementioned need. The ceiling feed assembly of the present invention is adaptable to fit with three prior art raceways having different cross-sectional configurations, namely, different cross-sectional shapes and/or sizes. The ceiling feed assembly thus overcomes the above-described prior art problem by eliminating the requirement for and cost of two of the three ceiling feed assemblies that were used heretofore to accommodate the three prior art raceways.

Accordingly, the present invention is directed to a ceiling feed assembly which comprises a ceiling fitting mountable to a wall surface and including a front panel having a first opening and at least one portion in the front panel being removable therefrom for defining a second opening in the front panel different from and overlapping at least a portion of the first opening. The first opening is for receiving a first raceway having a first cross-sectional configuration. The second opening is for receiving a second raceway having a second cross-sectional configuration different from the first cross-sectional configuration of the first raceway.

More particularly, the ceiling fitting includes a base and a cover on the base and, preferably, removably interfitted with the base. The base has a first side and a second side. The first side is mountable to one of a ceiling and a wall while the second side is positionable adjacent to the other of the ceiling and the wall such that the base is mountable at a junction of the ceiling and the wall. The cover includes the front panel. The first opening of the front panel has a substantially rectangular configuration with a width and a height for receiving one raceway of a first cross-sectional configuration in the first opening of the front panel. The second opening of the front panel has a substantially rectangular configuration with a width and a height. The width of the second opening of the front panel is greater than the width of the first opening and the height of the second opening of the front panel is greater than the height of the first opening for receiving another raceway of a second cross-sectional configuration in the second opening of the front panel. Alternatively, the width of the second opening of the front panel is greater than the width of the first opening of the front panel and the height of the second opening of the front panel is less than the height of the first opening of the front panel for receiving still another raceway of a third cross-sectional configuration in the alternative second opening, which now is a third opening, of the front panel.

The present invention also is directed to a raceway adapter. The raceway adapter is intended for use with the alternative second opening, or the third opening, of the front panel for receiving the raceway of the third cross-sectional configuration. The raceway adapter includes a main body having a substantially inverted U-shaped configuration and opposite ends defining inwardly extending hooks, a top flange having a rear side and mounted to and extending vertically upward from the main body, and a coupling member having a substantially L-shaped configuration and mounted to and extending outwardly and vertically upward from the rear side of the top flange. The main body is configured for receiving and fitting at least partially around the raceway of the third cross-sectional configuration. The top flange and coupling member together interfit with a portion of the front panel of the cover such that the top flange blocks a portion of the first opening of the front panel of the cover above the third opening of the front panel of the cover for receiving the raceway of the third cross-sectional configuration and such that the main body is disposed adjacent to and aligned with the front panel of the cover about the third opening of the front panel of the cover.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 4 is an exploded perspective view of the ceiling feed assembly of the present invention having a ceiling fitting with a cover having a front panel with an entry opening configured to receive an end of the first raceway of FIG. 1 and adaptable to receive the ends of the second and third raceways of FIGS. 2 and 3.

FIG. 4A is an enlarged fragmentary cross-sectional view of the cover of the ceiling fitting taken along lines 4A—4A of FIG. 4 showing a rear elevational view of the front panel of the cover.

FIG. 5 is an exploded perspective view of the ceiling feed assembly of the present invention with the front panel of the cover of the ceiling fitting adapted to receive the end of the second raceway of FIG. 2.

FIG. 6 is an exploded perspective view of the ceiling feed assembly of the present invention having, in addition to the ceiling fitting, a raceway adapter mountable to the front panel of the cover of the ceiling fitting across the entry opening thereof for adapting the front panel of the cover to receive the end of the third raceway and hide a portion of the entry opening configured for receiving the end of the first raceway of FIG. 1.

FIG. 7 is an assembled perspective view of the ceiling feed assembly of the present invention with the end of the third raceway supported by the raceway adapter and received in the entry opening of the front panel of the ceiling fitting cover of the assembly.

FIG. 8 is a top plan view of the ceiling feed assembly as seen along line 8—8 of FIG. 7.

FIG. 9 is a side elevational view of the assembly as seen along line 9—9 of FIG. 8.

FIG. 10 is a front elevational view of the assembly as seen along line 10—10 of FIG. 8.

FIG. 11 is a rear perspective view of the raceway adapter of the assembly shown in FIG. 6.

FIG. 12 is a front elevational view of the raceway adapter as seen along line 12—12 of FIG. 13.

FIG. 13 is a side elevational view of the raceway adapter as seen along line 13—13 of FIG. 12.

FIG. 14 is a rear elevational view of the raceway adapter as seen along line 14—14 of FIG. 13.

DETAILED DESCRIPTION OF THE INVENTION

Figure 1:
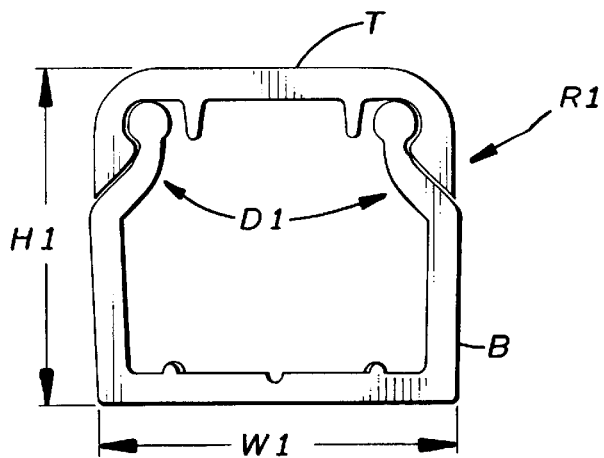
FIG. 1 is an end elevational view of a first prior art raceway having a first cross-sectional configuration.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

Figure 2:
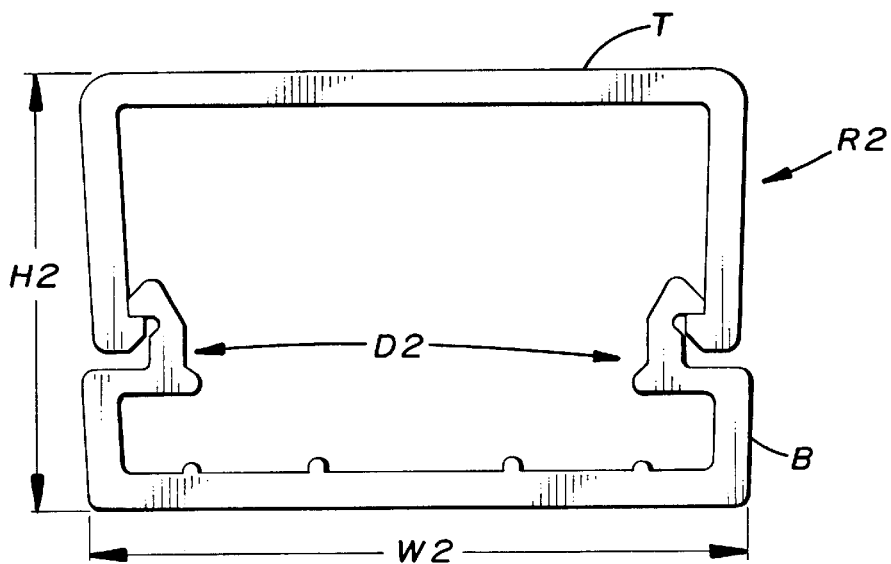
FIG. 2 is an end elevational view of a second prior art raceway having a second cross-sectional configuration different from the first raceway of FIG. 1.
Figure 3:
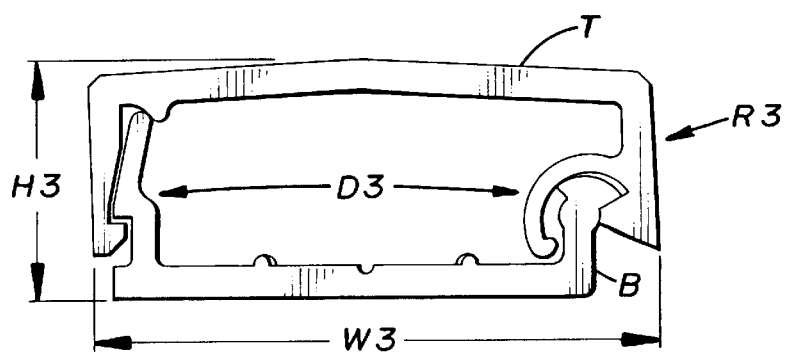
FIG. 3 is an end elevational view of a third prior art raceway having a third cross-sectional configuration different from the first and second raceways of FIGS. 1 and 2.

Referring to the drawings and particularly to FIGS. 4 to 10, there is illustrated a ceiling feed assembly of the present invention, generally designated 10, adaptable to fit with any one of the three prior art raceways R1, R2, R3 of respective FIGS. 1 to 3 having the different cross-sectional configurations, namely shapes and/or sizes, as described in the background hereinbefore. The ceiling feed assembly 10 basically includes a ceiling fitting 12 formed of a base 14 and a cover 16 mounted on the base 14. While the base 14 and cover 16 are shown as separable components, they could be provided as a single inseparable component.

The cover 16 of the ceiling fitting 12 includes a front panel 18 having a first opening 20 of a first configuration and at least one and preferably both of first and second removable portions 22, 24, as seen in FIGS. 4 and 4A, being respectively removable from the front panel 18. The first configuration of the first opening 20 being substantially rectangular in shape conforms to the first cross-sectional configuration of the first raceway R1. The first opening 20 has a width slightly greater than the width W1 of the first raceway R1 and a height slightly greater than the height H1 of the first raceway R1 for fitting an end of the first raceway R1 therethrough, as seen in FIG. 4. The first opening 20 having the first configuration thereby adapts the cover 16 to receive the first raceway R1 of FIG. 1 having the first cross-sectional configuration.

The first removable portion 22 of the front panel 18 encompasses substantially all of the front panel 18 as bounded by depression or score line 22A in FIGS. 4 and 4A along which the first portion 22 is broken away from the remainder of the cover 16. Removal of the first portion 22 defines or provides a second opening 26 in the front panel 18 of a second configuration different from and overlapping the first opening 20 of the first configuration. The second configuration of the second opening 26 being substantially rectangular in shape conforms to the cross-sectional configuration of the second raceway R2. The second opening 26 has a width and a height greater than, respectively, the width and the height of the first opening 22. The width of the second opening 26 is slightly greater than the width W2 of the second raceway R2 and the height of the second opening 26 is slightly greater than the height H2 of the second raceway R2 for fitting an end of the second raceway R2 therethrough, as seen in FIG. 5. The second opening 26 having the second configuration thereby adapts the cover 16 to receive the second raceway R2 of FIG. 2, having the second cross-sectional configuration different from the first cross-sectional configuration of the first raceway R1.

The second removable portion 24 of the front panel 18 includes first and second parts 24A along opposite sides of the first opening 20 which are bounded by depressions or score lines 24B, as seen in FIGS. 4 and 4A, along which the parts 24A are broken away from the remainder of the front panel 18. The second removable portion 24 is included within the first removable portion 22 and thus is substantially smaller in size than the first removable portion 22. Removal of the second portion 24 defines or provides a third opening 28 in the front panel 18 of a third configuration different from the second configuration of the second opening 26 and different from and overlapping the first opening 20 of the first configuration. The third configuration of the third opening 28 being substantially rectangular in shape conforms to the cross-sectional configuration of the third raceway R3. The width of the third opening 28 is greater than the width of the first opening 20 and the height of the third opening 28 is less than the height of the first opening 20. The width of the third opening 28 is slightly greater than the width W3 of the third raceway R3 and the height of the third opening 28 is slightly greater than the height H3 of the third raceway R3 for fitting an end of the third raceway R3 therethrough, as shown in FIGS. 6 and 7. The third opening 28 having the third configuration thereby adapts the cover 16 to receive the third raceway R3 of FIG. 3, having the third cross-sectional configuration different from the first cross-sectional configuration of the first raceway R1 and second cross-sectional configuration of the second raceway R2.

The base 14 of the ceiling fitting 12 has a first side 30 and a second side 32 being substantially of the same area as one another. The first side 30 is positionable adjacent to a ceiling (not shown) while the second side 32 is mountable to a wall (not shown) such that the base 14 is mountable at a junction of the ceiling and the wall. The base 14 has a substantially L-shaped configuration. The first side 30 and the second side 32 are disposed at substantially right angles with respect to one another.

The first side 30 preferably constitutes a top wall 30 of the base 14 having a substantially rectangular and flat configuration. The top wall 30 has opposite sides 30A and opposite ends 30B. The top wall 30 has an inner portion 34 and an outer portion 36. The inner portion 34 is offset from the outer portion 36. The outer portion 36 has rounded corners opposite from the inner portion 34. The top wall 30 also defines a knockout 38 centrally on the outer portion 36. The knockout 38 is in the form of a pair of spaced apart interrupted concentric circles. The knockout 38 may be removed for passage of wires through the top wall 30 into and from the ceiling.

The second side 32 preferably constitutes a rear wall 32 of the base 14 having a substantially rectangular and flat configuration. The rear wall 32 has opposite sides 32A and opposite ends 32B. One of the ends 32B of the rear wall 32 is integral with one of the ends 30B of the top wall 30. The rear wall 32 also defines four holes 40. The holes 40 are spaced apart from one another and each is disposed adjacent to a corner of the rear wall 32. Each hole 40 has a substantially circular configuration and a diameter substantially the same as the diameter of the other holes 40. Each hole 40 is for receiving a fastener (not shown) therethrough for securing the rear wall 32 to the wall. The rear wall 32 further has four ribs 42 each of a substantially C-shaped configuration. The ribs 42 are spaced apart from one another and disposed adjacent to and partially surround respective ones of the holes 40. Each rib 42 has opposite ends. One end of each rib 42 is flush with one of the sides 32A of the rear wall 32 and the other end of each rib 42 is flush with one of the ends 32B of the rear wall 32. The rear wall 42 also defines a knockout 44 centrally thereon. The knockout 44 is spaced an equal distance from each of the ribs 42 and is in the form of a pair of spaced apart interrupted concentric circles. The knockout 44 of the rear wall 32 has substantially the same size and structure as the knockout 38 of the top wall 30. The knockout 44 may be removed, if desired, for passage of wires through the rear wall 32 into and from the wall. The ribs 42 are for preventing contact between the fasteners and the wires extending through the rear wall 32. The base 14 also has a pair of opposite lateral walls 46 each with an upper portion 46A and a lower portion 46B. The upper portion 46A has a substantially triangular configuration and is integral with and extends along one of the sides 30A of the top wall 30. The lower portion 46B has a substantially rectangular configuration and is integral with and extends along one of the sides 32A of the rear wall 32. The upper portions 46A defines notches 48 formed at upper ends of the respective upper portion 46A adjacent to the rounded corners of the outer portion 36 of the top wall 30. The lower portions 46B defines slots 50. Each slot 50 has a substantially rectangular configuration and is spaced from and disposed at a location approximately halfway between the ends 32B and along one of the sides 32A of the rear wall 32. The respective ends of the first, second and third raceways R1, R2, R3 will abut against the one end 32B of the rear wall 32 of the base 14 spaced from the top wall 30 thereof when fitted into the respective first, second and third openings 20, 26, 28 of the cover 16.

The cover 16 of the ceiling fitting 12 has a configuration which complements the configuration of the base 14 such that the cover 16 and the base 14 together form the ceiling fitting 12 having the form of an enclosure. The cover 16 preferably is removably interfittable over and with the base 14. In addition to the front panel 18, the cover 16 has a top wall 52, a front wall 54 and a pair of opposite side walls 56. The top wall 52 has a substantially rectangular configuration and extends vertically while the front panel 18 extends horizontally when the ceiling fitting 12 is disposed at the junction of the ceiling and the wall. The front panel 18 thus is disposed in substantially perpendicular relation to the top wall 52. The front wall 54 has a substantially rectangular configuration and extends between the top wall 52 and the front panel 18. The front wall 54 is disposed at an angle in relation to each of the top wall 52 and the front panel 18. Each of the opposite side walls 56 has a substantially rectangular configuration except for being truncated across one corner where it connects to the inclined front wall 54. The side walls 56 of the cover 16 have upper rear edges 56A and lower bottom edges 56B disposed in substantially perpendicular relation to one another.

The cover 16 also has a pair of flanges 58 and a pair of ledges 60. Each of the flanges 58 has a substantially triangular and flat configuration. Each flange 58 is disposed on the inside of and extends outwardly from a corner formed by the top wall 52 and one of the side walls 56. Each ledge 60 has a substantially triangular configuration and is disposed on and extends outwardly from the lower bottom edge 56B of one of the side walls 56. When the cover 16 and the base 14 are interfitted together, the cover 16 overlies the base 14 such that the flanges 58 of the cover 16 are inserted within the notches 48 of the base 14 and the ledges 60 on the side walls 56 of the cover 16 are snap fitted with the slots 50 on the base 14.

Referring now to FIGS. 6 to 14, the assembly 10 also includes a raceway adapter 62. The raceway adapter 62 includes a main body 64, a top flange 66 and a coupling member 68. The main body 64 has a substantially inverted U-shaped configuration. The main body 64 has opposite ends defining inwardly extending hooks 70. The main body 64 has a width greater than its height. The main body 64 is for receiving and fitting at least partially around a raceway, particularly the third raceway R3. The width of the main body 64 is slightly greater than the width W3 of the raceway R3 and the height of the main body 64 is slightly greater than the height H3 of the raceway R3 for fitting the end of the raceway R3 therethrough, as shown in FIGS. 7 to 10. The top flange 66 has a substantially rectangular configuration and a front side 66A and a rear side 66B. The top flange 66 is mounted to and extends vertically upward from the main body 64. The width of the top flange 66 is substantially the same as the width of the main body 64. The height of the top flange 66 is less than the height of the main body 64. The coupling member 68 has a substantially L-shaped configuration. The coupling member 68 is mounted to and extends outwardly and vertically upward from the rear side 66B of the top flange 66. The coupling member 68 has a width and a height less than, respectively, the width and the height of the top flange 66. The coupling member 68 is disposed at a central location on the top flange 66. The top flange 66 and the coupling member 68 together interfit with a portion of the front panel 20 of the cover 14 and such that the top flange 66 blocks a portion of the first opening 20 of the front panel 18 of the cover 16 above the third opening 28 of the front panel 18 of the cover 16 for receiving the third raceway R3 and such that the main body 64 is disposed adjacent to and aligned with the front panel 18 of the cover 16 about the third opening 28 thereof.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A ceiling feed assembly, comprising:
   (a) a ceiling fitting mountable to a wall surface;
   (b) said ceiling fitting including a front panel having a first opening and at least one portion in said front panel being removable therefrom for defining a second opening in said front panel different from and overlapping at least a portion of said first opening, said first opening for receiving a first raceway having a first cross-sectional configuration, said second opening for receiving a second raceway having a second cross-sectional configuration different from the first cross-sectional configuration of the first raceway.

2. The assembly as recited in claim 1, wherein said first opening has a substantially rectangular configuration with a width and a height.

3. The assembly as recited in claim 2, wherein said second opening has a substantially rectangular configuration with a width and a height.

4. The assembly as recited in claim 3, wherein said width of said second opening is greater than said width of said first opening and said height of said second opening is greater than said height of said first opening.

5. The assembly as recited in claim 1, further comprising:
   a raceway adapter including
      (i) a main body having a substantially inverted U-shaped configuration and opposite ends defining inwardly extending hooks, said main body for receiving and fitting at least partially around the second raceway,
      (ii) a top flange having a rear side and mounted to and extending vertically upward from said main body, and
      (iii) a coupling member having a substantially L-shaped configuration and being mounted to and extending outwardly and vertically upward from said rear side of said top flange, said top flange and said coupling member together interfitting with a portion of said front panel of said cover such that said top flange blocks a portion of said first opening of said front panel of said cover above said second opening thereof for receiving the second raceway and such that said main body of said adapter is disposed adjacent to and aligned with said front panel of said cover about said second opening thereof.

6. A ceiling feed assembly, comprising:
   (a) a base having a first side and a second side, said first side being mountable to one of a ceiling and a wall, said second side being positionable adjacent to the other of the ceiling and the wall such that said base is mountable at a junction of the ceiling and the wall; and
   (b) a cover on said base and including a front panel having a first opening and at least one portion in said front panel being removable therefrom for defining a second opening in said front panel different from and overlapping at least a portion of said first opening, said first opening for receiving a first raceway having a first cross-sectional configuration, said second opening for receiving a second raceway having a second cross-sectional configuration different from the first cross-sectional configuration of the first raceway.

7. The assembly as recited in claim 6, wherein said cover is removably interfittable on said base.

8. The assembly as recited in claim 6, wherein said first opening has a substantially rectangular configuration with a width and a height.

9. The assembly as recited in claim 8, wherein said second opening has a substantially rectangular configuration with a width and a height.

10. The assembly as recited in claim 9, wherein said width of said second opening is greater than said width of said first opening and said height of said second opening is greater than said height of said first opening.

11. The assembly as recited in claim 6, further comprising:
   a raceway adapter including
      (i) a main body having a substantially inverted U-shaped configuration and opposite ends defining inwardly extending hooks, said main body for receiving and fitting at least partially around the second raceway,
      (ii) a top flange having a rear side and mounted to and extending vertically upward from said main body, and
      (iii) a coupling member having a substantially L-shaped configuration and being mounted to and extending outwardly and vertically upward from said rear side of said top flange, said top flange and said coupling member together interfitting with a portion of said front panel of said cover such that said top flange blocks a portion of said first opening of said front panel of said cover above said second opening thereof for receiving the second raceway and such that said main body of said adapter is disposed adjacent to and aligned with said front panel of said cover about said second opening thereof.

12. A ceiling feed assembly, comprising:
   (a) a base having a first side and a second side, said first side being mountable to one of a ceiling and a wall, said second side being positionable adjacent to the other of the ceiling and the wall such that said base is mountable at a junction of the ceiling and the wall; and
   (b) a cover on said base and including a front panel having a first opening and first and second portions in said front panel, said first portion of said front panel being removable for defining a second opening in said front panel different from and overlapping at least a portion of said first opening, said second portion of said front panel being removable for defining a third opening in said front panel different from and overlapping at least a portion of said first and second openings, said first opening for receiving a first raceway having a first cross-sectional configuration, said second opening for receiving a second raceway having a second cross-sectional configuration different from the first cross-sectional configuration of the first raceway, said third opening for receiving a third raceway having a third cross-sectional configuration different from each of the first and second cross-sectional configurations of the respective first and second raceways.

13. The assembly as recited in claim 12, wherein said cover is removably interfittable on said base.

14. The assembly as recited in claim 12, wherein said first opening has a substantially rectangular configuration with a width and a height.

15. The assembly as recited in claim 14, wherein said second opening has a substantially rectangular configuration with a width and a height.

16. The assembly as recited in claim 15, wherein said width of said second opening is greater than said width of said first opening and said height of said second opening is greater than said height of said first opening.

17. The assembly as recited in claim 15, wherein said third opening has a substantially rectangular configuration with a width and a height.

18. The assembly as recited in claim 17, wherein said width of said third opening is greater than said width of said first opening and said height of said third opening is less than said height of said first opening.

19. The assembly as recited in claim 17, wherein said width of said third opening is less than said width of said second opening and said height of said third opening is less than said height of said second opening.

20. The assembly as recited in claim 19, further comprising:
    a raceway adapter including
    (i) a main body having a substantially inverted U-shaped configuration and opposite ends defining inwardly extending hooks, said main body for receiving and fitting at least partially around the third raceway,
    (ii) a top flange having a rear side and mounted to and extending vertically upward from said main body, and
    (iii) a coupling member having a substantially L-shaped configuration and being mounted to and extending outwardly and vertically upward from said rear side of said top flange, said top flange and said coupling member together interfitting with a portion of said front panel of said cover such that said top flange blocks a portion of said first opening of said front panel of said cover above said third opening thereof for receiving the third raceway and such that said main body of said adapter is disposed adjacent to and aligned with said front panel of said cover about said third opening thereof.

21. A raceway adapter for a ceiling feed assembly, said raceway adapter comprising:
    (a) a main body having a substantially inverted U-shaped configuration and opposite ends defining inwardly extending hooks, said main body for receiving and fitting at least partially around a raceway;
    (b) a top flange having a rear side and mounted to and extending vertically upward from said main body; and
    (c) a coupling member having a substantially L-shaped configuration and mounted to and extending outwardly and vertically upward from said rear side of said top flange, said top flange and said coupling member together interfitting with a portion of a front panel of a cover of the assembly such that said top flange blocks a portion of a first opening of the front panel of the cover above a second opening of the front panel of the cover for receiving the raceway and such that said main body is disposed adjacent to and aligned with the front panel of the cover about the second opening of the front panel of the cover.

22. The adapter as recited in claim 21, wherein said main body has a width greater than a height of said main body.

23. The adapter as recited in claim 22, wherein said top flange has a width substantially the same as said width of aid main body and said top flange has a height substantially less than said height of said main body.

24. The adapter as recited in claim 23, wherein said coupling member has a width and a height less than respectively said width and said height of said top flange.

* * * * *